United States Patent [19]
Conley

[11] Patent Number: 5,208,440
[45] Date of Patent: May 4, 1993

[54] PLASMA ARC CUTTING OF CONDUCTIVE AND NON-CONDUCTIVE MATERIALS

[76] Inventor: James A. Conley, 280 Meadow St., Meadville, Pa. 16335

[21] Appl. No.: 758,562

[22] Filed: Sep. 12, 1991

[51] Int. Cl.$^5$ ............................................. B23K 9/00
[52] U.S. Cl. ........................... 219/121.44; 219/121; 219/39; 219/121.59
[58] Field of Search ............... 219/121.59, 121.39, 219/121.44, 121.52, 121.48, 75

[56] References Cited

U.S. PATENT DOCUMENTS

| | | | |
|---|---|---|---|
| 4,194,106 | 3/1980 | Rudaz et al. | 219/123 |
| 4,495,399 | 1/1985 | Cann | 219/121.44 |
| 4,691,090 | 9/1987 | Garlanov et al. | 219/121.5 |
| 4,740,668 | 5/1988 | Perez | 219/121.39 |
| 4,792,657 | 12/1988 | Conley | 219/121.39 |
| 4,880,958 | 11/1989 | Conley | 219/121.58 |

FOREIGN PATENT DOCUMENTS 0256667  5/1988  Fed. Rep. of Germany ............ 219/121.44

*Primary Examiner*—Mark H. Paschall
*Attorney, Agent, or Firm*—Charles L. Lovercheck; Wayne L. Lovercheck

[57] ABSTRACT

A system and method for cutting insulation and metal using a plasma arc is provided. The system includes a plasma arc cutter for cutting sheets of insulation and metal. The plasma arc cutter has a torch adapted to constantly arc. The sheets of insulation and metal are positioned below the torch. The method of cutting insulation and metal uses the plasma arc cutter system to cut sheets of insulation and metal. In accordance with a preferred embodiment of the method of the invention insulation and metal are cut without vertically moving the torch of the plasma arc cutter system. A rolling table of a plasma cutting system is loaded with a sheet of insulation. The table is rolled to move the sheet of insulation into cutting position below the torch. The sheet of insulation is cut and then removed by rolling table out from under the torch, loading a sheet of metal onto the table and rolling it under the torch. The tip of the torch has an electrical ground. As the torch is moved over the insulation sheet the current transfers to the ground in the tip. As the torch is moved over the metal sheet the current transfers to the metal as ground. As the torch is moved off the metal sheet the current transfers to the ground in the tip.

14 Claims, 1 Drawing Sheet

PLASMA ARC CUTTING OF CONDUCTIVE AND NON-CONDUCTIVE MATERIALS

BACKGROUND OF THE INVENTION

The invention relates to a method of cutting using a plasma arc. The invention provides an improved method of cutting insulation or metal using a plasma arc. The improvements of the invention each taken alone or in combination add to resolve the problems of the prior art.

As used herein "plasma arc" means metal working processes that use a constricted electric arc. Constriction of the arc is usually accomplished by passing the arc through a water-cooled copper orifice to control the energy density of the arc stream.

Conley in U.S. Pat. No. 4,880,958 discloses a torch support for plasma cutting system, the disclosure of which is incorporated herein by reference.

Garlanov et al in U.S. Pat. No. 4,691,090 disclose a method and device for plasma cutting of non-metallic materials.

Rudaz et al in U.S. Pat. No. 4,194,106 disclose methods and devices for cutting, eroding, welding and depositing metallic and non-metallic materials by means of an electric arc.

One problem of the prior art is that it does not provide a method of cutting insulation or metal using a plasma arc. The improvements of the present invention beneficially provide a novel, nonobvious and useful manner of cutting insulation using a plasma arc.

SUMMARY OF THE INVENTION

These problems of the prior art are overcome by the improved method of cutting insulation or metal using a plasma arc of the present invention. Changes in setup of the prior art are prevented in a method of cutting insulation or metal using a plasma arc in accordance with the present invention.

A system and method for cutting insulation using a plasma arc is provided. The system includes a plasma arc cutter for cutting sheets of insulation and metal. The plasma arc cutter has a torch adapted to constantly arc. The sheets of insulation or metal are positioned below the torch. The method of cutting insulation or metal uses the plasma arc cutter system to cut sheets of insulation or metal. In accordance with a preferred embodiment of the method of the invention insulation or metal are cut without vertically moving the torch of the plasma arc cutter system. A rolling table of a plasma cutting system is loaded with a sheet of insulation. The table is rolled to move the sheet of insulation into cutting position below the torch. The sheet of insulation is cut and then removed by rolling table out from under the torch, loading a sheet of metal onto the table and rolling it under the torch. The tip of the torch has an electrical ground. As the torch is moved over the insulation sheet the current transfers to the ground in the tip. As the torch is moved over the metal sheet the current transfers to the metal as ground. As the torch is moved off the metal sheet the current transfers to the ground in the tip.

It is an object of the invention to provide a system for cutting insulation using a plasma arc.

It is an object of the invention to provide a method for cutting insulation using a plasma arc.

It is an object of the invention to provide a system having a torch adapted to constantly arc for cutting insulation positioned below the torch.

It is an object of the invention to provide a method for cutting using a system having a torch adapted to constantly arc for cutting metal and insulation positioned below the torch.

It is an object of the invention to provide a method for cutting using a system having a torch adapted to constantly arc for cutting metal and insulation without vertically moving the torch.

BRIEF DESCRIPTION OF THE DRAWINGS

The objects features and advantages of the present invention will become more fully apparent from the following detailed description of the preferred embodiment, the appended claims and the accompanying drawings in which:

DESCRIPTION OF THE PREFERRED EMBODIMENTS

Figure 1:
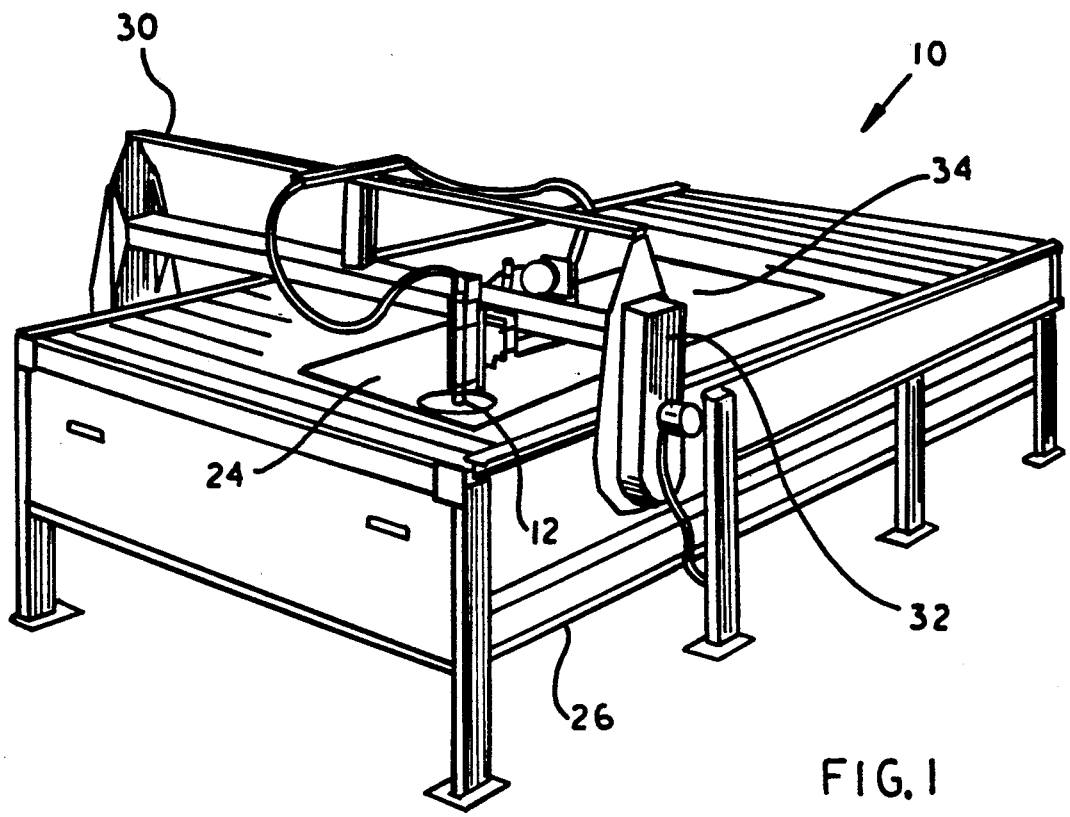
FIG. 1 is a schematic side view of a system for cutting insulation or metal using a plasma arc in accordance with the invention.
Figure 2:
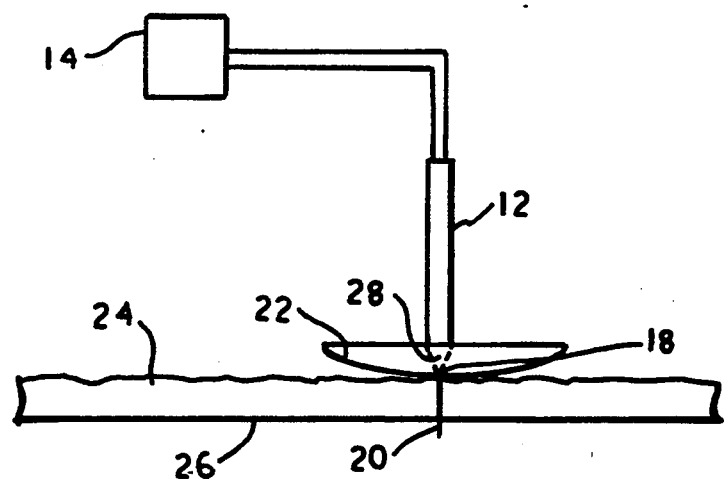
FIG. 2 is a side view of torch positioned relative to the workpiece.

The preferred embodiment of the invention is illustrated by way of example in FIG. 1. FIG. 1 shows a system 10 for cutting insulation or metal using a plasma arc in accordance with the present invention. System 10 includes torch 12 connected by cable 14 to electrical power source 16. Plasma 18 forms pin point flame 20 as it passes through guard 22. Pin point flame 20 has a temperature of about 10,000 degrees F. and rapidly cuts through insulation 24 which is supported by table 26.

Pin point flame 20 provides a hot jet of gas which readily melts fiberglass insulation. Preferably, a ground source is not used under the insulation. A ground is provided in tip 28. Metal becomes a ground as torch 12 passes over it.

In accordance with a preferred embodiment of the invention the rolling table of a plasma cutting system is loaded with a sheet of insulation. The plasma arc cutter has a torch adapted to constantly arc. The table is rolled to move the sheet of insulation into position below the torch. In accordance with a preferred embodiment of the method of the invention insulation or metal are cut without vertically moving the torch of the plasma arc cutter system. Thus, the sheet of insulation is removed by rolling table out from under the torch, loading a sheet of metal onto the table and rolling it under the torch.

The tip of the torch has an electrical ground. As the torch is moved over a metal sheet the current transfers to the metal as ground. As the torch is moved off the metal sheet the current transfers to the ground in the tip.

A system and method for cutting insulation or metal using a plasma arc is provided in accordance with a preferred embodiment of the invention. The system includes a plasma arc cutter for cutting sheets of insulation or metal on a stationary table. The plasma arc cutter has a torch adapted to constantly arc. The sheets of insulation and metal are positioned below the torch. In accordance with a preferred embodiment of the method of the invention insulation and metal are cut without vertically moving the torch of the plasma arc cutter system. A sheet of insulation is positioned on the table, and the torch is then moved into cutting position above the sheet. The sheet of insulation is cut and then removed by positioning the torch to the side of the sheet, loading a sheet of metal onto the table and moving the torch over the metal sheet. The tip of the torch has an electrical ground. As the torch is moved over the insulation sheet the current transfers to the ground in the tip. As the torch is moved over the metal sheet the current transfers to the metal as ground. As the torch is moved off the metal sheet the current transfers to the ground in the tip.

While the present invention has been disclosed in connection with the preferred embodiment thereof, it should be understood that there may be other embodiments which fall within the spirit and scope of the invention as defined by the following claims.

What is claimed is:

1. A method of cutting insulation and sheet metal for air conditioning duct work using a plasma arc, comprising:
   providing a plasma arc cutter and alternately sheets of insulation and metal, said plasma arc cutter being adapted to constantly arc; and,
   cutting alternately said sheets of insulation and metal.

2. The method of claim 1 wherein said plasma arc cutter comprises a torch connected through a cable to electrical power source.

3. A method of cutting insulation and sheet metal for use in air conditioning duct work using a plasma arc, comprising:
   providing a plasma arc cutter, said plasma arc cutter being adapted to constantly arc;
   providing alternately sheets of insulation and sheets of metal; and,
   cutting said alternate sheets of insulation and metal into substantially identical shapes to form corresponding duct wall and duct insulation parts.

4. The method of claim 3, wherein said flame has a temperature of about 10,000 degrees F. and rapidly cuts through insulation.

5. The method of claim 4 wherein said flame provides a hot jet of gas which readily melts fiberglass insulation.

6. The method of claim 3 wherein said plasma arc cutter comprises a torch adapted to form a plasma, said plasma being formed into a pin point flame by a guard.

7. A system for cutting insulation and sheet metal for air conditioning duct work using a plasma arc, comprising:
   providing a plasma arc cutter, sheets of insulation and sheet metal;
   said plasma arc cutter having a torch;
   said torch being adapted to constantly arc; and,
   said sheets of insulation and sheet metal being alternately positioned below said torch whereby a sheet of insulation is cut into predetermined shapes, and then a sheet of metal is cut into substantially corresponding shapes to provide duct wall and duct insulation with a single system.

8. The system of claim 7 wherein said insulation is air conditioning duct insulation.

9. The system of claim 7 wherein said plasma arc cutter comprises a torch connected through a cable to electrical power source.

10. The system of claim 7 wherein said plasma arc cutter comprises a torch adapted to form a plasma; and, said plasma being formed into a pin point flame by a guard.

11. The system of claim 10 wherein said flame has a temperature of about 10,000 degrees F. and rapidly cuts through insulation sheet metal.

12. The system of claim 11 wherein said flame provides a hot jet of gas which readily melts fiberglass insulation sheet metal.

13. The system of claim 11 wherein said torch further comprises a tip having an electrical ground adapted to receive electrical current as said torch is moved over said insulation sheet.

14. The system of claim 12 in combination with a metal sheet;
   said tip being adapted to transfer electrical current to said metal sheet as said torch is moved over said metal sheet; and,
   said tip being adapted to transfer electrical current to said electrical ground as said torch is moved off said metal sheet.

* * * * *